July 8, 1969   H. W. QUALLS   3,453,960
NONCONTAMINATING LINEAR EXPLOSIVE SEPARATION
Filed Dec. 11, 1967   Sheet 1 of 2

HAROLD W. QUALLS
INVENTOR.

BY Earl F. Kotte
ATTORNEY

AGENT

United States Patent Office 3,453,960
Patented July 8, 1969

3,453,960
NONCONTAMINATING LINEAR EXPLOSIVE SEPARATION
Harold W. Qualls, San Diego, Calif., assignor to General Dynamics Corporation, San Diego, Calif., a corporation of Delaware
Filed Dec. 11, 1967, Ser. No. 690,052
Int. Cl. F42b *15/10*
U.S. Cl. 102—49.5                                    5 Claims

ABSTRACT OF THE DISCLOSURE

A structure for linearly separating the skin of a space vehicle without contamination of the surrounding volume, wherein the skin has a weakened portion along the line of separation and a tube of expandable material is placed against the weakened portion and enclosed in abutting contact by flanges or stop members secured to the skin on opposite sides of the weakened portion, so that expansion of said tube applies direct expansive force against the stop members thereby pushing the stop members and skin apart at the weakened portion without an explosion of the tube.

Background of the invention

Present-day developments in the field of missiles and rocketry often require that a device be projected into a ballistic trajectory at extremely high speeds, or in some instances it is required that highly delicate instruments be placed into orbit. Often it is required that such equipment, during the latter portions of its flight path, be exposed to the outer atmosphere so that measurements may be taken, an antenna be able to function, a portion of the vehicle be ejected or other similar operation be performed. In many of these instances it is required that the equipment be protected from adverse conditions as it is projected through the atmosphere of the earth. For example, a sounding rocket may contain in its forward portion any of a number of forms of highly sensitive upper atmosphere measuring devices which will function properly only if suitable protective means are provided to surround the aforesaid equipment during the early portions of its flight through the dense and contaminated lower layers of the earth's atmosphere. Suitable means should also be provided to protect the devices from damage during stage separation. At a suitable time during the flight of the vehicle it is required that the protective covering be removed so as to enable the equipment to function properly.

While it is relatively simple to design a protective covering suitable for a missile or rocket during its exit from the atmosphere, it should be realized that a major problem is encountered in removing the protective covering from the missile while it is in flight. The principal method of effectuating such a removal, as known to the prior art, consists of an explosive mounting, usually including explosive bolts, which for example, upon detonation will separate a nose cone from its main missile body so as to expose various elements protected thereby.

However, the explosive separation thus accomplished might contaminate delicate instruments and the projected shrapnel which flies around in uncontrolled directions may cause harmful damage to the surrounding instruments and equipment.

Summary of the invention

The present invention therefore aims to overcome the various shortcomings of prior structural separation devices and to provide a greatly improved non-contaminating linear explosive separation means which is light of weight and reliable.

It is an object of this invention to provide an improved means of separating structural members without the emission of contaminating gases or projection of harmful shrapnel.

Another object of the present invention is to provide a means of separating structural members in a reliable and smooth manner.

Another object of the present invention is to provide a structural configuration which can be separated when desired by actuation of means which will expand a member in the structure causing a high pressure for shearing a skin member which will separate the structural configuration.

Another object of the present invention is to provide a safe means of separating a joint by ignition of explosive means but in such a way that injury to personnel and equipment is prevented by the detonation.

Other and further objects of this invention will be obvious upon understanding of the following description and claims taken in connection with the accompanying drawings forming a part of this application, in which:

In general the present invention comprises a means for separating a structure into two parts. The structure is provided with a separation joint which has a skin member with an integral flange. A stop member is mounted on the skin member and abuts the flange so that an enclosed aperture or space is formed. Part of the skin member has a weakened portion, which is made by a groove or the like, which weakened portion is part of the structure forming the aperture. A tube of an expandable material, filled with an explosive or detonation means, abuts the inside walls of the aperture. When expansion of the tube, caused by ignition of the explosive or detonation means, occurs, a force is created which will sever the skin member at the weakened portion and thus separates the structure into two parts.

Figure 1:
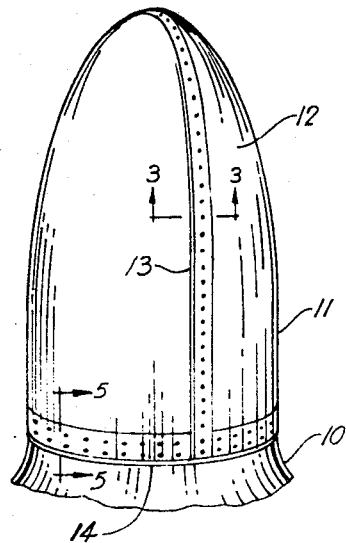
FIGURE 1 represents a perspective drawing of a nose cone section of a missile.

Referring now to the drawings, there is shown in FIGURE 1 a section of a missile 10, having a nose cone 11 which is formed from a skin 12. The separation joints 13 and 14 are shown in more detailed version in FGURES 3 to 6.

Figure 2:
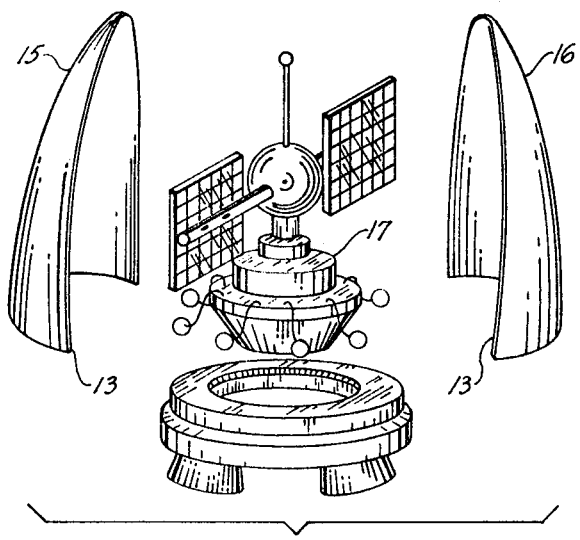
FIGURE 2 shows a pictorial view at the moment that the nose section or shrouds are separated from the missile body and wherein the two semi-paraboloid segments or shroud portions of the nose cone are ejected from one another.

In FIGURE 2 is illustrated a separation of the nose cone 11 from the missile 10 and a separation of the shrouds or nose cone 11 into two paraboloid segments 15 and 16. Delicate instrumentation 17 equipped with various components is shown for illustrative purposes only, and seen ejected from the separated paraboloid segments 15 and 16.

Figure 3:
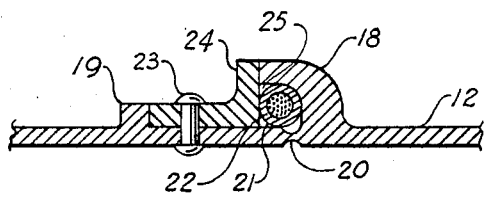
FIGURE 3 is an enlarged sectional view taken along line 3—3 of FIGURE 1.
Figure 4:
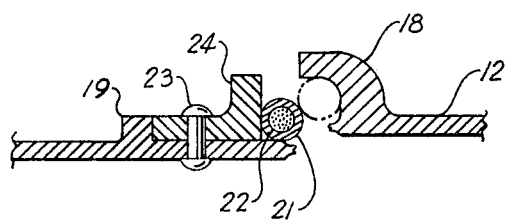
FIGURE 4 is the same sectional view as shown in FIGURE 3, however, after ignition of the explosive charge has severed the structure into two parts.

In FIGURES 3 and 4, the separation joint 13 is shown to comprise, a skin member 12 having a flange 18, a lug 19 and a weakened portion 20. Further a tube 21 filled with detonation means 22 or explosive powder or the like is shown in cross-section. A fastening means 23, such as a bolt, or the like, mounts a stop member 24 on the splice member 12 between the lug 19 and flange 18. An aperture or hole 25 is thus formed by the flange 18, weakened portion 20 of skin member 12 and stop member 24.

Figure 5:
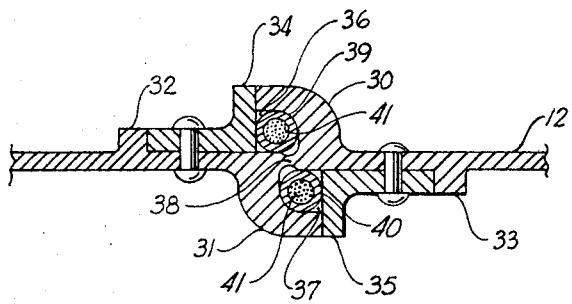
FIGURE 5 is an enlarged sectional view turned 90° and taken along line 5—5 of FIGURE 1.
Figure 6:
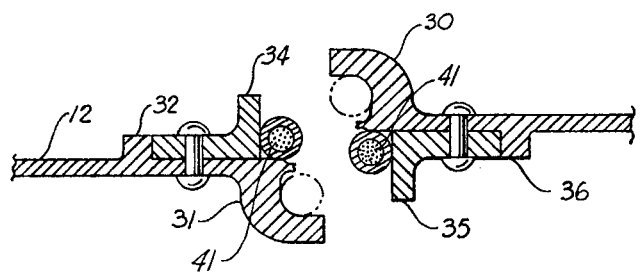
FIGURE 6 is the same sectional view as shown in FIGURE 5, however, after the ignition of the explosive charges have severed the structure into two parts.

In FIGURES 5 and 6, the separation joint 14 is shown to comprise the skin member 12 having two flanges 30 and 31 and two lugs 32 and 33 positioned oppositely from one another. Fastening means 23 holds stop members 34 and 35 between the integral flanges 30 and 31 and integral lugs 32 and 33 respectively. The skin member 12 is further provided with a weakened portion 38. The flanges 30 and 31, stop members 34 and 35 and the weakened portion 38 form apertures 36 and 37 which are filled with tubes 39 and 40 containing detonating material 41.

The tube 21 in FIGURES 3 and 4 and the tubes 39 and 40 in FIGURES 5 and 6 may comprise known confined detonating or explosive cords having an explosive with an outer tube or sheath that instantaneously expands upon detonation while containing the explosive. Examples of such explosive cords are "Zip Cord" that is manufactured and sold by Lockheed Missiles and Space Company, Sunnyvale, Calif. and "CDC" that is manufactured and sold by Explosive Technology, Inc., Fairfield, Calif. "Zip Cord" generally comprises a length of explosive cord having approximately 2½ grains of explosive for each foot of length and the explosive cord is enclosed in a tube having a thickness of .07 to .13 inch and an outer web with a thickness of approximately .03 to .1 inch. The tubing and web may be constructed of magnesium, aluminum or beryllium. The "CDC" explosive cord comprises a lead-sheathed 2.5 grain/foot explosive with a woven fiber as the confining medium. The lead-sheathed explosive may also have several layers of fiberglass flexible sleeving and a cover of heat shrinkable tubing. The explosive load used in the "CDC" explosive cord may, as designed by the manufacturer, comprise RDX, PETN, HNS–II, HMX, Dipam and other suitable explosives. The manufacturers of the aforesaid explosive cords make several sizes from which an explosive cord having the desired force for use in this invention may be selected.

Upon igniting the explosive cord, the explosive energy expands the diameter of the tube, but does not rupture the tube. The expansion of the tube creates a large stress on the surrounding enclosing structure. However, the surrounding structure is strong enough to withstand this pressure except for the weakened portion 20 or 28. The weakened portion will crack because of the pressure developed from the expanding tube causing a pulling stress upon the weakened section rather than a buckling thereof. After the weakened section is cracked or severed, the missile vehicle will sever into the required stage separation. As illustrated in FIGURES 4 and 6, the separation force aids in pushing the stages apart from one another. The skin 12 is severed in such a way that contaminating gases of the explosive are contained within the expanded tube and the projection of harmful shrapnel is eliminated, because the skin is cracked or severed at only one place and not by the explosion effect but by stress created on that one weakened section.

It will be understood that the separating joints 13 and 14 as shown and described are interchangeable and further that one or two or even more expandable tubes can be incorporated, but that the illustrations as shown provide two of the preferred embodiments of this invention only.

In FIGURES 4 and 6 the joints 13 and 14 respectively are shown separated. This separation is caused after ignition of the explosive elements 22 or 41, which causes the tubes 21, 38 and 39 to expand and exert pressure on their surrounding structural surfaces. The stop members 24, 34 and 35 are opposing pressure through their reaction with lugs 19, 32 and 33 respectively. Stress created by the exerted pressure of the expanded tubes 21, 39 and 40 causes a fracture of the skin 12 along the weakened portion 20 and 38 and separates the skin or skin member 12 into two parts.

Thus it may be seen that the present invention provides a separation means which is light in weight, reliable in operation and avoids shrapnel damage and smoke or harmful gases. It is further evident to persons familiar with this art that the present invention is adaptable to a variety of configurations and purposes wherever separation means are required.

Having described my invention, I now claim:

1. A joint for separating a structure into at least two parts without producing contamination comprising:
   a skin member having an integral flange,
   a stop member mounted on said skin member and abutting said flange so that an enclosed aperture is formed between said flange and said skin member,
   part of said skin member having a weakened portion,
   said weakened portion being part of said enclosed aperture,
   a tube of expandable material, filled with detonation means, intimately engaged within said aperture,
   and whereby expansion of said tube caused by activation of said detonation means creates a force for shearing said skin member at said weakened portion and linear separation of said two parts.

2. A separation joint as claimed in claim 1 wherein said weakened portion in said skin member comprises a thinner portion of material having less yielding strength than said remaining enclosed structure.

3. A separation joint as claimed in claim 2 wherein, said tube is non-rupturing during said expansion.

4. A separation joint for smoothly separating, contamination free, a structure comprising:
   a member having an integral flange on each side thereof opposing one another and having recesses directed in opposite directions,
   a stop member mounted on each side of said member and abutting said integral flanges so that closed apertures are formed on each side of said member,
   said apertures being substantially air tight and filled with tubes of expandable material,
   said member being provided with one weakened section coincidental with both of said apertures,
   and said tubes containing explosive means for expanding said tubes upon ignition of said explosive means providing a pressure which breaks said one weakened section and forces said separation joint apart in a linear direction.

5. A separation joint as claimed in claim 4 wherein, said tubes retain their structural integrity during said expansion.

References Cited
UNITED STATES PATENTS

| | | | |
|---|---|---|---|
| 3,139,031 | 6/1964 | Schroter et al. | 102—49.5 |
| 3,311,056 | 3/1967 | Noddin | 102—27 |
| 3,362,290 | 1/1968 | Carr et al. | 89—1.01 |

VERLIN R. PENDEGRASS, *Primary Examiner.*